United States Patent

Simsa et al.

[11] Patent Number: 5,312,632
[45] Date of Patent: May 17, 1994

[54] METHOD FOR THE MANUFACTURE OF FODDER AND/OR SOIL IMPROVING AGENTS FROM WASTE MATERIAL

[75] Inventors: Peter Simsa; Jenó Toth; Lajos Czakó; Pál Mihaltz, all of Budapest, Hungary

[73] Assignees: Vertikum Magas-es Melyepitmenyjavito Kisszovetkezet, Hungary; Henri-Davis Gutmans, Switzerland

[21] Appl. No.: 932,311

[22] Filed: Aug. 26, 1992

Related U.S. Application Data

[62] Division of Ser. No. 571,259, Aug. 23, 1990, Pat. No. 5,198,252.

[30] Foreign Application Priority Data

Dec. 23, 1988 [DE] Fed. Rep. of Germany ....... 3843670

[51] Int. Cl.$^5$ ........................... A23B 7/10; A23B 4/22
[52] U.S. Cl. ......................................... 426/53; 426/54; 426/623; 426/630; 426/636; 426/807
[58] Field of Search .................... 426/53, 54, 623, 630, 426/636, 807

[56] References Cited

U.S. PATENT DOCUMENTS

| | | |
|---|---|---|
| 2,168,722 | 8/1939 | Townsend . |
| 4,069,350 | 1/1978 | Monsod . |
| 4,359,530 | 11/1982 | Brown . |
| 4,751,089 | 6/1988 | Heikonen et al. . |
| 5,198,252 | 3/1993 | Simsa et al. ........................ 426/807 |

FOREIGN PATENT DOCUMENTS

| | | |
|---|---|---|
| 515275 | 5/1953 | Belgium . |
| 0227584 | 10/1986 | European Pat. Off. . |
| 13354 | 1/1983 | Japan . |
| 184783 | 10/1984 | Japan . |
| 261284 | 11/1986 | Japan . |
| 49045 | 1/1988 | Japan . |
| 1209139 | 2/1986 | U.S.S.R. . |
| 2041403 | 9/1980 | United Kingdom . |

OTHER PUBLICATIONS

Byron et al., Hyacinth Control Journal, 13:64–67 (1975).
Csernavolgyi, et al., Chem. Abst., 104:147491k.
Abstract of: Tomtitchong, P., J. Sci. Res. 81): 156–165 (1983).
Gulati, S. L., Zbl. Bakt. I, Abt., 135: 413–417 (1980).
El-Serafy et al., Proc. Int'l Symp. on the Constraints of Ruminant Pord. in the Dry Subtropics (1989).
Byron et al., Chem. Abst. vol. 87, No. 4287t, "Organicacid preservation of water hyacinth silage".
Viswanathan et al., Abst. of Kerala Jnl of Vet. Science, (1985) vol. 16, pp. 163–166.

Primary Examiner—Helen F. Pratt
Attorney, Agent, or Firm—Wegner, Cantor, Mueller & Player

[57] ABSTRACT

There is described a method for the manufacture of fodder and/or soil improving agents by anaerobic or aerobic fermentation of environmentally disturbing aquatic plants, specifically water hyacinth (*Eichhornia crassipes*), which, if desired, have been comminuted.

7 Claims, No Drawings

METHOD FOR THE MANUFACTURE OF FODDER AND/OR SOIL IMPROVING AGENTS FROM WASTE MATERIAL

This application is a divisional application under §1.60 of U.S. Ser. No. 07/571,250 (now U.S. Pat. No. 5,198,252), which is a continuation-in-part under 35 USC §120 and §365 of PCT application number PCT/EP89/01600, filed Dec. 21, 1989.

BACKGROUND OF THE INVENTION

The subject-matter of the invention is a method for manufacturing or obtaining fodder and/or soil improving agents from waste materials, for instance from environmentally disturbing aquatic plants and aquatic weeds respectively, particularly floating freshwater plants, such as specifically the water hyacinth (*Eichhornia crassipes*).

It has been known for a long time that aquatic weeds, such as the water hyacinth, propagate, specifically under tropical conditions, at a very fast rate, rapidly and thickly covering a large part of the water surface, which disturbs shipping, chokes up irrigation plants and affects the living conditions for fish and birds. An example hereof are the problems occurring in Egypt, where in Lake Nasser south of the Aswan Dam and in the irrigation and drainage systems, favourable conditions are created for the propagation of aquatic weeds. The propagation of these aquatic weeds is aggravated by the eutrophication of the waters caused by the intensive agriculture using high quantities of fertilizers, so that these aquatic weeds constitute an acute problem. For instance, they do not only impede the water flow through the canals, but also cause, as a result of evapotranspiration, the loss of high quantities of water, so that it is common practice to remove these materials mechanically or destroy them by means of herbicides which considerably impair the environment.

On the other hand, specifically in those areas where such aquatic weeds are able to propagate particularly intensively, as in the developing countries, or also in Egypt, there is a considerable need for animal protein which could be satisfied by improving the fodder.

From GB-PS 2 041 403, the preparation of fodder by the biological transformation of waste material of agriculture by means of anaerobic and aerobic fermentation methods is already known. According to this process, the cellulose of comminuted straw and corn stems is decomposed with the help of a cellulase enzyme released by Trichoderma viridae and the so formed glucose is converted into lactic acid.

On the other hand, it is known that the water hyacinth is not useful as a fodder on account of its high mineral content, and that it can be used, at best, for the production of bio-gas (Easley and Shirley (Hyacinth Control Journal 12 (1974), 82-85).

SUMMARY OF THE INVENTION

The object of the present invention is the economic utilization of actually disturbing aquatic plants, in order to thereby prevent the hitherto accepted environmental pollution and to obtain valuable products, specifically fodder and/or soil improving agents.

It has now been found that it is possible to convert also such environmentally disturbing aquatic plants as, in particular, the water hyacinth, by anaerobic or aerobic fermentation into a product which can be used as a fodder and/or a soil improving agent. Thus, it is possible to utilize the heretofore unused protein content of these environmentally disturbing aquatic plants in a manner which is advantageous in the economic point of view. For instance, the particularly high protein content of the water hyacinth can be utilized in spite of the high mineral content of this plant. Whilst the plants which are usually grown on the soil, such as Sudan grass or lucerne, yield protein contents of only 0.5 tons and 4 tons per hectare respectively, the water hyacinth in corresponding areas provides annually about 30 tons of protein per hectare. In this connection, the protein of the water hyacinth is characterized further by a particularly high content of essential amino acids, such as specifically lysine.

Therefore, the subject-matter of the invention is the method for the manufacture of fodder and/or soil improving agents.

DETAILED DESCRIPTION OF THE INVENTION

The method according to the invention, basically, resides in that the environmentally disturbing aquatic plants are obtained, i.e. harvested, if desired comminuted and the plant pieces which, if desired, have been pressed are mixed with about 20 to about 70 percent by weight of organic waste material of the food industry and/or agriculture having a dry substance content of at least 20 percent by weight and inoculating agents and additives for the biological degradation respectively known per se, and anaerobically or aerobically fermented for about 2 to about 45 days, preferably for about 10 to about 30 days, by methods known per se. Thereby, the anaerobically fermented material provides a fodder, whilst by aerobic fermentation a soil improving agent is obtained.

In the method according to the invention, as environmentally disturbing aquatic plants, water nymph (*Naias armata*), duck weed (*Lemna gibba*), pond weed (Potamogeton spp.), rootless hornwort plants (*Ceratophyllum demersum*), cattail (*Typha domingensis*), common reed (*Phragmites australis*), cyperacious plants and tamarisk plants as well as specifically water hyacinths (*Eichhornia crassipes*) can be used. In the method according to the invention, it is also possible to use mixtures of one or more of these plant species.

According to a preferred embodiment of the method according to the invention for the manufacture of fodder, the comminuted pieces of leaves and stems of the aquatic plants which, if desired, have been pressed, are mixed with 20 to 70 percent by weight, more preferably 40 to 60 percent by weight, of the organic waste material of the food industry and/or agriculture having a dry substance content of at least 20 percent by weight and inoculating agents and additives for the biological degradation respectively known per se and anaerobically fermented for 2 to 45 days, preferably 10 to 30 days, and even more preferably 10 to 20 days.

As organic waste material of the food industry and/or agriculture, cellulose, hemicellulose and/or lignine-containing organic waste materials, specifically rice straw, milled cotton seed shells, extracted sugar cane and/or corn stems can be used. As inoculating agents and additives for the biological degradation respectively, preferably at least one pectin-cleaving enzyme known per se, such as pectinase, and/or thermophilic lactic acid bacteria cultures known per se having an activity of about $10^6$ to about $10^{10}$ cells per gram dry substance and molasses, urea and/or organic carboxylic acids having 1 to 5 carbon atoms respectively, are used.

As thermophilic lactic acid bacteria, *Lactobacillus mallei*, *Lactobacillus delbruckii* and *Lactobacillus plantarum* (ATCC 14917) are preferred.

As organic carboxylic acids having 1 to 5 carbon atoms, advantageously formic acid, acetic acid, propionic acid and/or acrylic acid, preferably as a about 10 to about 50% by weight aqueous solution, is used.

Further, it is preferred to add to the mixture a starter culture known per se having a high cellulose activity, specifically *Trichoderma viridae*, *Chaetonium globosum* and/or Actinomycetes.

All of the microorganisms employed in the method according to the invention are well-known and can be obtained, for instance, from the known depositories, such as American Type Culture Collection (ATCC), etc.

This mixture is then anaerobically fermented for 2 to 45 days, preferably 10 to 30 days, preferably 10 to 20 days, at a temperature of 20° to 35° C. The product so obtained can be used as a fodder.

A particularly preferred embodiment of this method according to the invention for the manufacture of fodder resides in that comminuted leaves and/or stems of the aquatic plants which, if desired, have been pressed, are mixed with 40 to 60 percent by weight of chopped rice straw, milled cotton seed shells having a particle size $\leq 1$ mm and/or extracted chopped sugar cane having a dry substance content of at least 20 percent by weight, 0.5 to 4.0 percent by weight, preferably 1 to 3 percent by weight, and particularly 2 percent by weight, of molasses as a 20% by weight aqueous solution and/or urea, 0.5 to 2.0 percent by weight, particularly 0.1 percent by weight, of a pectin-cleaving enzyme, preferably pectinase, 0.2 to 1.0 percent by weight, particularly 0.5 percent by weight, of the thermophilic lactic acid bacteria cultures, 0.2 to 2.0 percent by weight, particularly 0.3 to 0.5 percent by weight, of the starter culture having a high cellulase activity, and 0.1 to 0.5 percent by weight, particularly 0.2 percent by weight, of the organic carboxylic acid having 1 to 5 carbon atoms, each with respect to the weight of the water hyacinth plants, and anaerobically fermented under the exclusion of air for 2 to 45 days, preferably 10 to 30 days, at a temperature of 20° to 35° C.

A preferred embodiment of the method according to the invention for the manufacture of a soil improving agent resides in that the parts of the aquatic plants which are not useful for the manufacture of fodder, specifically the roots of these plants, and which, if desired, have been comminuted, and if desired, have been pressed, are mixed with 20 to 70 percent by weight, preferably 40 to 60 percent by weight, of organic waste material of the food industry and/or agriculture having a dry substance content of at least 20 percent by weight, are brought with waste material containing nitrogen and/or nitrogen-containing natural and/or synthetic fertilizer to a carbon/nitrogen ratio of 10/20 to 1/80 and the mixture is aerobically fermented for 2 to 45 days, preferably 10 to 30 days. In this manner, a product is obtained which can be utilized excellently as a soil improving agent.

In this embodiment of the invention, too, as organic waste material of the food industry and/or agriculture, cellulose, hemicellulose and/or lignine-containing organic waste materials, specifically rice straw, cotton seed shells, extracted sugar cane and/or corn stems are used. In the case of this procedure, it is possible furthermore to add to the mixture a starter culture known per se having a high cellulose activity, specifically *Trichoderma viridae*, *Chaetonium globosum* and/or Actinomycetes.

A particularly preferred embodiment of this procedure resides in that the aquatic plants which, if desired, have been comminuted, and if desired, have been pressed and/or the parts of the aquatic plants which are not useful for the manufacture of fodder, specifically the roots, and which, if desired, have been comminuted, and if desired, have been pressed, are mixed with 20 to 40 percent by weight of chopped rice straw, 5 to 30 percent by weight of straw-containing animal manure, and if desired, 0.2 to 2.0 percent by weight, more preferably 0.3 to 0.5 percent by weight, of the starter culture having a high cellulase activity, each with respect to the weight of the water hyacinth plants, and the mixture is aerobically composted under occasional mixing for 2 to 45 days, preferably 10 to 50 days, whereby an internal temperature inside the mixture of 40° to 60° C. is reached.

The method according to the invention makes possible a) the manufacture of valuable fodder materials and soil improving agents from waste materials, specifically from a plant material which heretofore had to be destroyed only laboriously and with the use of herbicides;

b) a simple, cost-saving and environmentally beneficial way of utilizing the actually undesired water hyacinth as fodder and/or a soil improving agent;

c) an improvement of the living conditions of the persons living in the tropics because the particularly high protein content of the biomass of the water hyacinth can be utilized; and d) the preparation of a soil improving agent, particularly a decayed compost which can be used as an effective means against the increasing degeneration into desert.

The following examples serve to further illustrate the invention.

EXAMPLE 1

1000 kg leaves of water hyacinths are comminuted into pieces having a size of 4 to 6 cm and pressed by means of a screw spindle/pressing device. Thus, 850 kg of pressed material are obtained which is spread on a polyethylene sheet. To this mass are added 100 kg of molasses as a 20% aqueous solution having a sugar content of 50 percent by weight, 100 kg of chopped rice straw, 50 kg of extracted chopped sugar cane, 1 kg of a pectincleaving enzyme (pectinase) and 1 kg of *Lactobacillus mallei* and *Lactobacillus delbruckii* bacteria cultures having an activity of $10^8$ to $10^{10}$ cells per gram dry substance which are added in the form of a suspension in 10 liters of water. The materials are mixed on the polyethylene sheet and sprayed with 2 liters of a 20% aqueous formic acid. After mixing, the material is packed vacuum-tight in the sheet. After a few days, the pH value of the so formed silage is 4.2. After taking the material out of the sheet after 10 days, one obtains a product which has a pleasant smell of lactic acid. With this material five cows can be fed for two weeks with, in each case, $3 \times 7$ kg of fodder per day. Thereby, the amount of milk produced by the cows increases by 9 to 10%. Concurrently, an increase in the milk fat content from 3% to 4.9% and of the protein content from 2.97% to 3.65% results.

EXAMPLE 2

500 kg of water hyacinth plants and 500 kg of scraps of water hyacinth roots are mixed with 200 kg of chopped rice straw and 100 kg of straw-containing animal manure. The mixture is spread on the soil in the form of prismatic heaps. The material is mixed weekly, whereby the internal temperature in the course of the aerobic fermentation rises to 40° to 60° C. After 30 days a dark-brown-coloured compost of good water-absorptive capacity which smells of earth is obtained, which proves excellently useful for soil improvement.

EXAMPLE 3

850 kg of the pressed water hyacinth material obtained according to example 1 are mixed on the polyethylene sheet with 150 kg of milled cotton seed shells having a particle size smaller than 1 mm. To the so formed base material having a moisture content of 30 percent by weight are then added 20 kg of molasses, 5 kg of urea in the form of a suspension in 25 l of water and 1 kg of *Lactobacillus plantarum* cultures (ATCC 14917) having an activity of $10^8$ to $10^{10}$ cells per gram dry substance. The material mixed on the sheet is sprayed with 3 liters of a 20% aqueous propionic acid solution, whereupon the material is pressed and vacuum-packed in the sheet. After a short time the pH value of the anaerobically fermenting material reaches the level 4.2. After 30 days, a product having a pleasant smell of lactic acid is obtained, which can be fed, with good results, to cows. Thereby, both the quantity and the quality of the milk produced can be significantly improved.

What is claimed is:

1. A method for the manufacture of fodder, and/or soil improving agents from waste material comprising harvesting environmentally disturbing aquatic plants and mixing the pieces thereof with:
   a) about 20 to about 70 percent by weight of organic waste material of the food industry, agriculture industry or both, said organic waste having a dry substance content of at least 20 percent by weight; and
   b) inoculating agents selected from the group consisting of a pectin cleaving enzyme, a thermophilic lactic acid bacteria culture having an activity of about $10^6$ to about $10^{10}$ cells per gram of dry substance, and a mixture thereof; and
   c) biological degradation agents selected from the group consisting of molasses, urea, organic carboxylic acids having 1 to 5 carbon atoms and mixtures thereof; and
   d) a starter culture having a high cellulase activity selected from the group consisting of Trichoderma viridae, Chaetonium globusum and Actinomycetes and mixtures thereof; wherein the resulting mixture is brought to a carbon/nitrogen ratio of about 1/20 to about 1/80 with waste material containing nitrogen, nitrogen-containing natural or synthetic fertilizer or a mixture thereof, and subsequently aerobically fermenting the mixture for about 2 to about 45 days.

2. The method according to claim 1 wherein, said fermentation is carried out for about 10 to about 30 days.

3. The method according to claim 1 wherein, said organic waste material of the food or agriculture industry is selected from the group consisting essentially of cellulose, hemicellulose, lignine-containing organic waste materials and mixtures thereof.

4. The method according to claim 3 wherein, said organic waste material of the food or agriculture industry is selected from the group consisting of rice straw, cotton seed shells, extracted sugar cane, corn stems and mixtures thereof.

5. The method according to claim 1 wherein, said aquatic plants are mixed with:
   a) 20 to 40 percent by weight of chopped rice straw; and
   b) 5 to 30 percent by weight of straw containing animal manure; and
   c) optionally 0.2 to 20 percent by weight of a starter culture having a high cellulase activity; and
   subsequently aerobically composting with occasional mixing for 2 to 45 days.

6. The method according to claim 5 wherein, said composting is from about 10 to about 30 days.

7. The method according to claim 1, wherein the aquatic plants harvested are comminuted, pressed or both prior to mixing.

* * * * *